United States Patent
Cramer et al.

(10) Patent No.: US 8,869,888 B2
(45) Date of Patent: Oct. 28, 2014

(54) CONTROLLED SOURCE FRACTURE MONITORING

(75) Inventors: Peter W. Cramer, Houston, TX (US); Peter M. Eick, Houston, TX (US); Joel D. Brewer, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 776 days.

(21) Appl. No.: 12/621,789

(22) Filed: Nov. 19, 2009

(65) Prior Publication Data

US 2010/0147512 A1  Jun. 17, 2010

Related U.S. Application Data

(60) Provisional application No. 61/121,976, filed on Dec. 12, 2008.

(51) Int. Cl.
*E21B 43/267* (2006.01)
*G01V 3/26* (2006.01)

(52) U.S. Cl.
CPC ............ *G01V 3/26* (2013.01); *E21B 43/267* (2013.01)
USPC .................................. 166/250.1; 166/280.2

(58) Field of Classification Search
USPC ........ 166/250.01, 255.1, 254.1, 250.1, 280.1, 166/280.2, 66
See application file for complete search history.

(56) References Cited

U.S. PATENT DOCUMENTS

| | | | |
|---|---|---|---|
| 4,446,433 A | 5/1984 | Shuck | |
| 6,725,930 B2 * | 4/2004 | Boney et al. | 166/280.2 |
| 6,898,529 B2 * | 5/2005 | Gao et al. | 702/11 |
| 7,073,581 B2 | 7/2006 | Nguyen et al. | |
| 2003/0136560 A1 * | 7/2003 | Mese et al. | 166/252.5 |
| 2003/0205376 A1 * | 11/2003 | Ayoub et al. | 166/254.2 |
| 2005/0274510 A1 | 12/2005 | Nguyen et al. | |
| 2006/0102345 A1 * | 5/2006 | McCarthy et al. | 166/250.1 |
| 2007/0209795 A1 | 9/2007 | Gupta | |
| 2008/0062036 A1 * | 3/2008 | Funk et al. | 342/22 |
| 2008/0283243 A1 | 11/2008 | Rediger et al. | |
| 2009/0087912 A1 * | 4/2009 | Ramos et al. | 436/27 |
| 2010/0038083 A1 * | 2/2010 | Bicerano | 166/280.2 |

FOREIGN PATENT DOCUMENTS

WO  2007013883  2/2007

* cited by examiner

*Primary Examiner* — Kenneth L Thompson
(74) *Attorney, Agent, or Firm* — ConocoPhillips Company

(57) ABSTRACT

Reservoir fractures are visualized using electrically active proppants to carry electric signals throughout the fracture. The electric signals are easily detected at the surface using RF antennae and a three-dimensional image of the fracture is generated.

9 Claims, 1 Drawing Sheet

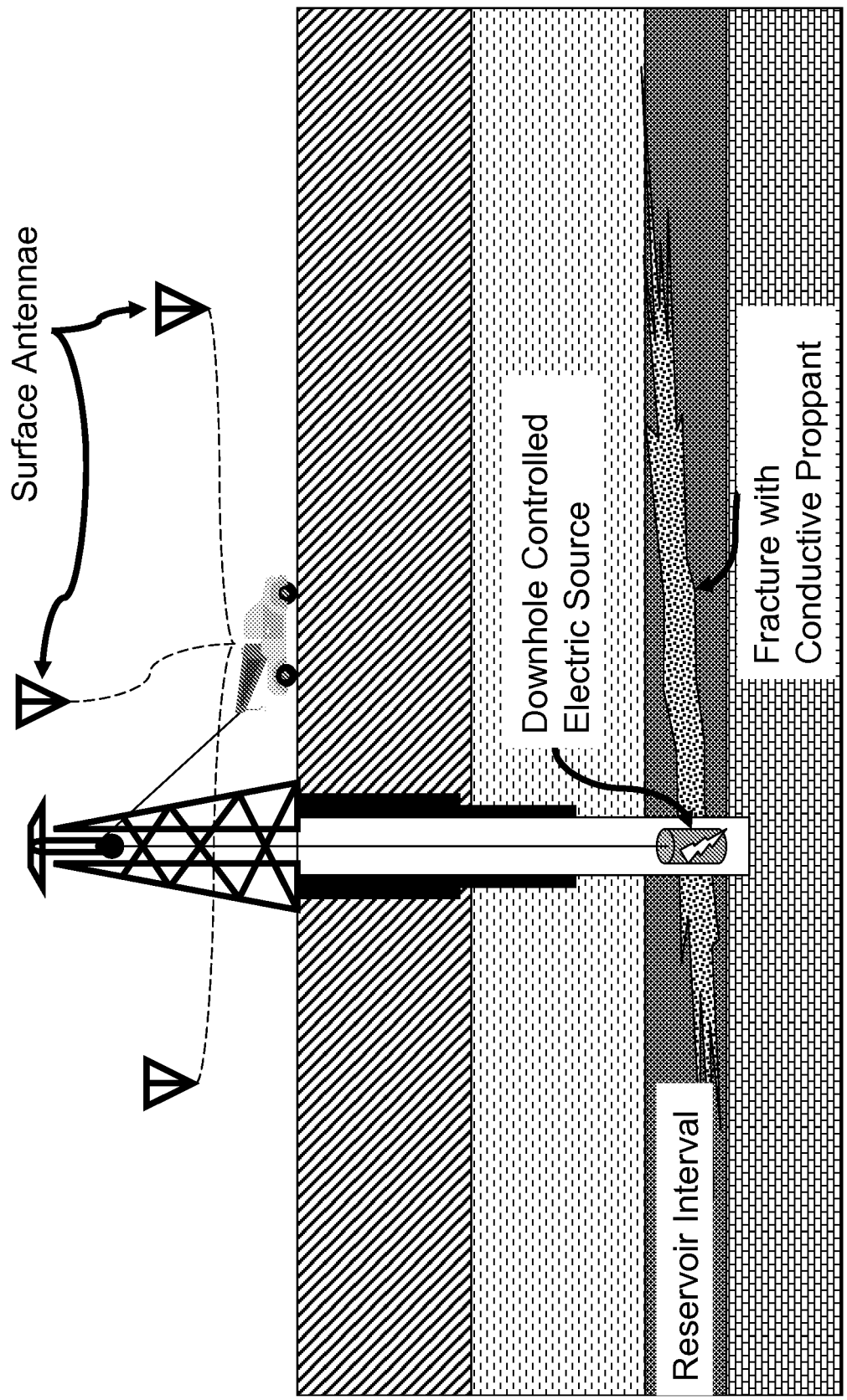

CONTROLLED SOURCE FRACTURE
MONITORING

CROSS REFERENCE TO RELATED APPLICATIONS

This application is a non-provisional application which claims benefit under 35 USC §119(e) to U.S. Provisional Application Ser. No. 61/121,976 filed Dec. 12, 2008, entitled "Controlled Source Fracture Monitoring" which is incorporated herein in its entirety.

STATEMENT OF FEDERALLY SPONSORED RESEARCH

None.

FIELD OF THE DISCLOSURE

The present disclosure generally relates to the identification and imaging of fractures in downhole oil well reservoirs. In one embodiment, a chargeable proppant is injected into a new fracture, electrical current through the proppant will emit a signal allowing detection and imaging of the fracture.

BACKGROUND OF THE INVENTION

Retrieving hydrocarbons from subterranean reservoirs is becoming more difficult, as existing reserves are depleted and production becomes more expensive. It has been estimated that mature fields account for up to 70% of the world's production or more. In order to increase production, reservoirs are often "fractured" through explosions, pressure, heat, and other known methods. The cracks and spaces made after fracturing are filled with sands and small particles called proppants to keep the fracture open and allow the flow of hydrocarbons through the proppants. The total amount of fracturing including length, width, and volume of the fractures, size of openings, and penetration into the reservoir are directly related to the flow of hydrocarbons from the fractured reservoir.

It has become common practice to induce higher production rates from low permeability reservoirs by creating fractures via application of hydraulic pressure downhole (aka "frac'ing a well"). These fractures are held open by emplacing "proppant", commonly sand or other highly permeable, inert material into the fracture. Hydrocarbon (usually gas) can then flow at increased rates to the wellbore via these highly permeable artificial fractures. Calculating flow from a fractured reservoir is dependent upon traditional fluid flow calculations and non-Darcy flow characteristics, since the combined effects may reduce flow near wellbore by more than 100-fold. The shape and flow in a fracture can have serious implications regarding effective fracture length. The effects of non-Darcy flow on the well productivity index are a function of proppant type and relative flow in the reservoir.

Some technologies have tried to determine the extent and position of a fracture using various imaging techniques. For example, William Shuck, U.S. Pat. No. 4,446,433, discloses transmitting and receiving antennae that penetrate the fracture and indicate fracture orientation and length. Funk, et al., US2008062036, measure propped fractures and down-hole formation conditions using radar imaging. Further, McCarthy, et al., WO2007013883, teach introducing a target proppant; transmitting electromagnetic radiation from about 300 megahertz-100 gigahertz; and analyzing a reflected signal from the target particle to determine fracture geometry.

Lastly, Nguyen and Fulton, U.S. Pat. No. 7,073,581, describe electroconductive proppant compositions and related methods of obtaining data from a portion of a subterranean formation. Downhole imaging methods that both transmit and receive signals from within the borehole are extremely limited because detection is not separated from the formation. Because downhole detection is nearly linear, variations in the length of the fracture cannot be distinguished. Likewise, fluctuations in the depth and width of the fracture will be obscured by downhole detection. Fracture visualization must be improved to assess fractures quickly and inexpensively.

Because aging wells often produce from multiple intervals, some very thin, the ability to place these stimulation treatments with pinpoint accuracy is a key to more effective remediation and increased ultimate recovery. An accurate method of visualizing fracture length, proppant penetration, and estimated flow in the new fracture are required to accurately assess production capabilities and the need for further remediation before production is initiated. Presently, no means exists to accurately assess the location (direction and distance from the wellbore) of an artificially induced fracture containing proppant. Knowing this information is of prime importance to the completion engineer in order to determine if fracturing was successful and as a predictor of expected production rates from the well. Present techniques (passive seismic or micro-seismic) can give only indirect estimates of fracture direction and distance, and can not ascertain whether or not the fracture contains proppant along its complete length. Without new imaging technologies, the cost of fracturing and packing remediated wells quickly exceeds the profit margins for mature production if multiple runs are required to assess fractures, packing, and flow.

BRIEF SUMMARY OF THE DISCLOSURE

Visualization of reservoir fracturing is improved by using an electrically active (EA) proppant, activating the EA proppant using a controlled electric source, and detecting the electromagnetic (EM) signal with a surface antennae to determine the precise location of an artificially induced fracture in a subsurface reservoir. Additionally, by using encoded EM signatures with the electrically active proppant-fracture fluid the background electromagnetic interference (EMI) can be removed and a higher resolution 3D- and 4D-fracture image can be generated.

EM signals include modulated RF, electric pulse, and/or EM. An encoded signal can be used to differentiate desired signal from other electrical signals and leakage. Signals may be encoded in phase, amplitude, frequency, or through complicated EM patterns. Signal generators include EM coil, slingram coil, resistivity, conductance, and the like. In one embodiment a downhole EM generator is brought into conduct with the EA proppant. In another embodiment an EM source is at the surface and the EM signal is transmitted via wire to the EA proppant.

The proposed process is to fracture the well using standard techniques and pump proppant that has been coated with an electrically active material into the fracture per usual procedures. Following this, a wireline tool would be run into the wellbore to the fracture and an electric current sent into the fracture. Alternatively, the electric current could be introduced into the fracture from the surface via electrical connections to the casing or the mudpit. Either an AC or reversing DC current could be used to generate a time-varying signal or pulse. Since the proppant has been coated with an electrically active material, the entire fracture (where there is proppant in it) should carry the electric signal and behave like an emitting antenna. Surface antennae would record the emitted (and time delayed) q signal and in a manner analogous to CSEM (Controlled Source Electromagnetic Logging) or LORAN, the G signal can be measured) time differences measured to pinpoint the length and location of the fracture where it contains proppant. A more accurate (direct vs. indirect) determination of fracture location can be achieved and an assessment of fracture quality based on the presence of proppant in the fracture.

BRIEF DESCRIPTION OF THE DRAWINGS

The invention may best be understood by reference to the following description taken in conjunction with the accompanying FIGURE.

FIGURE: Proppant visualization within a reservoir fracture.

DETAILED DESCRIPTION

The present invention provides a method of visualizing fractures in 3- and 4-dimensions using a conductive proppant, fracture fluid, or combination proppant and fracture fluid, where electromagnetic pulses transmitted through the electric proppant-fracture fluid mixture allow direct measurement of fracture size, penetration and packing. By transmitted specific encoded electromagnetic signals through the electric proppant-fracture fluid mixture, background signals can be removed and a very accurate and detailed 3D image can be generated.

Electromagnetic detection for geophysical surveys has been established for both oilfield and mining technologies, as well as traditional academic studies (Telford, 1991; Robinson, 1988). Magnetic (B) fields are detected using magnetometers to make EM, IP, TEM, MMR from radio frequency, AC and DC electric sources. In one embodiment a fluxgate heading and orientation 3-axis high-speed digital magnetometer is used to measure magnetic fields from DC to 3 kHz. Additionally, atomic SERF, EMF, optical gas, gauss, gradient, Overhauser, potassium, proton precession, scalar, super, superconducting quantum interference devices (SQUIDs), theodolite, vector, vector helium, very low frequency (VLF), gradiometers and magnetometers may be used to accurately measure magnetic fields. A variety of electromagnetic detectors can simultaneously measure time, direction, position, uncorrected magnetic field, corrected magnetic field, slope, frequency, phase both in-phase and out-of-phase components, x and y amplitude, total field strength, and other properties of electromagnetic signals (Dobrin & Savit, p. 19).

As defined herein a "proppant" is a composition of sized particles mixed with fracturing fluid to open and/or hold fractures open during and after a hydraulic fracturing treatment. In addition to naturally occurring sand grains, the sized proppant particles can be man-made or specially engineered particles, such as resin-coated sand or high-strength ceramic materials like sintered bauxite. Proppant particles are carefully sorted for size and sphericity to provide an efficient conduit for hydrocarbon production to the wellbore.

"Electrically active" or "EA" proppants contain either EA sized proppant particles, EA fracture fluid or both EA particles and fluid. Additionally, proppants may be constructed entirely out of EA materials such as dielectric polymers, ceramics, and the like.

EA sized particles may be manufactured entirely out of EA materials: such as metals including aluminum, steel, iron, alloys and the like; charged polymers such as polysaccharide and polyacrylamide; ceramics such as titanium diboride ($TiBo_2$), lead oxide (PbO), ruthenium dioxide ($RuO_2$), bismuth ruthenate ($Bi_2Ru_2O_7$), bismuth iridate ($Bi_2Ir_2O_7$), indium oxide ($In_2O_3$), molybdenum disilicide ($MoSi_2$), tin oxide ($SnO_2$) and doped ceramics like silicon carbide (SiC). Alternatively EA sized particles may be coated particles including sand, bauxite, ceramics, nut hulls, polystyrenes, hydroxyapatite, silicates, clay, and composites with an electric coating deposited on the particle.

In one embodiment ferromagnetic or paramagnetic materials such as iron, aluminum sulfate, $Al_2(SO_4)_{3-}$ or $Al_2O_{12}S_3$, often found as a hydrate, $.18H_2O$, bismuth, pyrolytic graphite, and others may be identified by either the magnetic susceptibility or diamagnetic susceptibility as listed in the CRC Handbook of Chemistry and Physics, $74^{th}$ ed., pp. 9-51 to 9-122 incorporated specifically herein by reference including all elements, inorganic compounds, organic compounds, and organosilicon compounds.

Blended or layered ceramic materials may be used that are electronically active including diamonds or doped diamonds, graphite, aluminum oxides, silica oxides, titanium oxides, and the like. Other ceramics may be used as a uniform, neutral base that is coated with an EAC.

Metals as used herein are any of several chemical elements with high conductance and thus conduct heat or electricity. Metals include aluminum, chrome, cobalt, copper, gold, iron, magnesium, mercury, molybdenum, nickel, palladium, platinum, selenium, silver, tin, titanium, tungsten, zinc, zirconia and the like. Alloys may also have favorable electrical activity and heat conductance including steel, carbon steel, stainless steel, various irons and leads, hastelloy, inconel, aluminum alloys, brass, bronze, beryllium copper, red brass, cupronickel, magnesium alloy, monel, titanium, zirconium, CuAg, CuNb, $Nb_3Sn$, and the like.

As defined herein "electrically active coatings" or "EAC" can be metals, conductive polymers, coatings and the like. The coatings may be anodized, galvanized, electroplated, hot-dipped, charge-dipped, chemically applied, arc-sprayed, electostatically applied and the like. EAC may be magnetizable, magnetized, or non-magnetizable dependent upon the system used and properties required. In one embodiment, EA sized particles are coated with thermally conductive silicone greases thickened with metal oxides such as zinc and aluminum to allow transfer of both heat and electricity. In another embodiment, electrostatic, powder, or electroplated coatings are used for an even and thorough coating of the EA sized particles.

In a preferred embodiment the proppant is packed with an electrically active liquid that coats the sized particles, fills spaces between sized particles, and provides a continuous electric signal like an emitting antenna. In a preferred embodiment the proppant and fracture fluid have unique electrical activity each generating a unique signal allowing visualization of the physical fracture (EA sized particles) and penetration into the reservoir (EA fracture fluid) as well as unique interactions between the EA sized particles and EA fracture fluid.

Methods of imaging a fracture are disclosed. In one embodiment a fracture is packed with an electrically active (EA) proppant, the proppant is charged with an electric signal, the electric signal is detected with one or more surface antennae, and the fracture is imaged using the detected electric signal.

The proppant can be an EA sized particle, an EA fracture fluid or both EA particle and fluid. EA sized particles may be selected from the group consisting of metal, aluminum, steel, iron, alloys, charged polymers, polysaccharide, polyacrylamide; ceramic and combinations depending upon the cost of the proppant and the conditions in the fracture. Proppants may be magnetic, paramagnetic, or diamagnetic. Proppants may be coated with an electrically active coating (EAC) including metals, conductive polymers, and charged coatings. EA sized particles include resin-coated particle selected from the group consisting of alumina, aluminosilicate, bauxite, ceramic, iron, metal, mullite, olivine, sand, silica, titanium, tungsten, zirconia and mixtures. Proppants may be mesh sized to less than approximately 100, 200, 500 mesh. The EA fracture fluid can be any conductive material including electrically active fluids, emulsions, doped liquids, lubricants and mixtures.

Commercially available geophysical magnetometers can be purchased or custom manufactured, including GEOSCAN FM™, SMARTSCAN EM™, RESIDUMETER II™, and the like. Suppliers include Electro-Matic Products Co., Digikey, Billingsley Aerospace, GEM Systems, Bell, and others.

TABLE 1

EXAMPLE MAGNETOMETERS

| Detector | Frequencies |
| --- | --- |
| Bell-4080 Gaussmeter | 25 Hz-1 kHz |
| Bell-4180 Triple-Axis Gaussmeter | 20 Hz-2 kHz |
| Bell-4190 Triple-Axis Gaussmeter | 20 Hz-2 kHz |
| Bell-5170 Hall-Effect Gauss/Tesla meter | DC-20 kHz |
| Bell-5180 Hall-Effect Gauss/Tesla meter | DC-30 kHz |
| MAGSTICK Tracer with headphones | 20 Hz-20 kHz |
| MSI-95 Single-Axis Gaussmeter | 25 Hz-3 kHz |
| Radio Frequency Meter | 100 MHz-3 GHz |

The biggest problem with traditional EM applications is separation of the regional from the residual field, i.e. the detection problem, in 3D. In the present example, the regional field is measured prior to fracture thus the regional field is defined. Additionally, the fracture initiation, including depth and direction, constrain the inversion of the residual 4D field to a specific area. Finally, the deposit to be visualized is created by fracturing the well and injecting a dike of known material with known properties into the break. Because many of the detection variables common to traditional mining and drilling visualization are defined: the material, the depth, and the residual are known, the problem is reduced to a simple inversion to determine the geometry of the new fracture.

Selecting the correct energy source and dopeant combination is essential for reducing costs and maintaining resolution while visualizing fractures under a variety of geophysical conditions. Electromagnetic (EM) fields, pulsed EM, and resistivity are useful for most backgrounds, dependent upon ground resistivity and fracture size (TABLE 2: Fracture detection). In some environments, IP techniques will be required to overcome background resistivity and lack of signal strength. Because general dipolar fields are used, resolution is increased but the field decays quickly. Each situation is different, EM may be used with hard rocks using an array of electrically active compounds but in gulf coast muds a more electrically active compound and a stronger energy source may be required. Fractures near salt domes will be the most difficult to visualize due to the electro-chemical properties of salt structures. Under higher salt conditions resistivity systems may be required.

TABLE 2

FRACTURE DETECTION

| Background | EM | Pulsed EM | IP | Resistivity |
| --- | --- | --- | --- | --- |
| Hard Rock | Yes | Yes | Yes | Yes |
| Shallow | Yes | Yes | Yes | Yes |
| Deep | Yes | Yes | Yes | Yes |
| Freshwater Mud | | Yes | Yes | Yes |
| Saltwater Mud | | Yes | Yes | Yes |
| High salt | | | | Yes |

In one embodiment a monitoring station (truck, backpack, recorder, or transmitter) is set up near the well bore to be fractured; the fracture device and an EM source are placed into the well bore, EM receivers are dispersed over the fracture area, a background signal is measured, the fracture is opened with EA proppant, and the fracture is visualized as shown in the FIGURE. In one alternative, the EA proppant is visualized during fracturing. In another embodiment a series of high pressure fractures and visualizations are repeated until a desired level of reservoir penetration is achieved to meet or exceed a desired production flow as predicted by fracture modeling.

Although the systems and processes described herein have been described in detail, it should be understood that various changes, substitutions, and alterations can be made without departing from the spirit and scope of the invention as defined by the following claims. Each and every claim is incorporated into the specification as an embodiment of the present invention. Thus, the claims are part of the description and should be deemed to be additional description to the preferred embodiments of the present invention.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:

1. U.S. Ser. No. 11/855,776 filed Sep. 14, 2007, Olson, et al., "Method and Apparatus for Pre-Inversion Noise Attenuation of Seismic Data."
2. U.S. Ser. No. 11/933,522 filed Nov. 1, 2007, Chiu, et al., "Method and Apparatus for Minimizing Interference Between Seismic Systems."
3. U.S. Ser. No. 12/167,683 filed Jul. 3, 2008, Brewer, et al., "Marine Seismic Acquisition with Controlled Streamer Flaring."
4. U.S. Ser. No. 61/109,279 filed Oct. 29, 2008, Eick, et al., "Variable Timing ZENSEIST™."
5. U.S. Ser. No. 61/109,329 filed Oct. 29, 2008, Chiu, et al., "Simultaneous Multiple Source Extended Inversion."
6. U.S. Ser. No. 61/109,403 filed Oct. 29, 2008, Eick, et al., "Marine Seismic Acquisition."
7. U.S. Ser. No. 61/112,810 filed Nov. 10, 2008, Brewer, et al., "4D Seismic Signal Analysis."
8. U.S. Ser. No. 61/112,875 filed Nov. 10, 2008, Eick and Brewer, "Practical Autonomous Seismic Recorder Implementation and Use."
9. U.S. Ser. No. 61/121,976 filed Dec. 12, 2008, Cramer et al., "Controlled Source Fracture Monitoring."
10. U.S. Pat. No. 4,446,433, William Shuck, "Apparatus and method for determining directional characteristics of fracture systems in subterranean earth formations" (May 1, 1984).

11. U.S. Pat. No. 7,073,581 Nguyen and Fulton, "Electroconductive proppant compositions and related methods," (Dec. 15, 2005)
12. US2008062036, Funk, et al., "Logging device with downhole transceiver for operation in extreme temperatures" (Mar. 13, 2008).
13. WO2007013883, McCarthy, et al., "Method of Estimating Fracture Geometry, Compositions and Articles Used for the Same" (Feb. 1, 2007).
14. Dobrin & Savit *Introduction to Geophysical Prospecting*, 4th edition, McGraw-Hill, 1988
15. Gidley, et al., "Effect of Proppant Failure and Fines Migration on Conductivity of Propped Fractures." SPE 24008.
16. Holditch, et al., "The Effects on Non-Darcy Flow on the Behavior of Hydraulically Fractured Gas Wells." SPE 5586.
17. Muecke, "Formation Fines and Factors Controlling Their Movement in Porous Media." SPE 7007.
18. Robinson and Coruh, *Basic Exploration Geophysics*, New York, 1988.
19. Telford, et al., *Applied Geophysics $2^{nd}$ Ed*, Cambridge University Press, Cambridge, 1991.

We claim:

1. A method of imaging a fracture comprising:
   a) packing an electrically active (EA) proppant into a fracture,
   b) charging said proppant with an electric signal, wherien the electrical signal is encoded;
   c) detecting said electric signal with one or more surface antennae, and
   d) imaging said fracture using the detected eletric signal (c),
   wherein said EA proppant comprises an EA sized proppant particle, an EA fracture fluid or both EA sized proppant particle and EA fracture fluid.

2. The method of claim 1, wherein said EA sized proppant particle is selected from the group consisting of metal, aluminum, steel, iron, alloys, charged polymers, polysaccharide, polyacrylamide, ceramic or combinations thereof.

3. The method of claim 1, wherein said EA sized proppant particle is magnetic, paramagnetic, or diamagnetic.

4. The method of claim 1, wherein said EA sized proppant particle is coated with an electrically active coating (EAC).

5. The method of claim 4, wherein said EAC is selected from the group consisting of metals, conductive polymers, and charged coatings.

6. The method of claim 1, wherein said EA sized particle is a resin-coated particle selected from the group consisting of alumina, aluminosilicate, bauxite, ceramic, iron, metal, mullite, olivine, sand, silica, titamium, tungsten, zirconia and combinations thereof.

7. The method of claim 1, wherein said EA proppant has a size mesh of less than approximately 100, 200, or 500 mesh.

8. The method of claim 1, wherein said EA fracture fluid is selected from the group consisting of EA fluids, EA emulsions, EA doped liquids, EA lubricants and combinations thereof.

9. The method of claim 1, wherin said EA fracture fluid is any condutive material.

* * * * *